United States Patent [19]
Anthony nee Barbier et al.

[11] 3,726,984
[45] Apr. 10, 1973

[54] HEATING ELEMENTS, ASSEMBLIES COMPRISING SEVERAL OF THESE ELEMENTS, FURNACES CONSTRUCTED BY MEANS OF SAID ELEMENTS OR ASSEMBLIES, AND PREHEATING METHOD FOR SAID FURNACES

[75] Inventors: Anne-Marie Anthony nee Barbier, Meudon; Krzysztof Dembinski, Tigy; Michele Faucher nee Dupre, Fontenay le Fleury; Lucien Dupont, Vouzon, all of France

[73] Assignee: Agence Nationale de Valorisation de la Recherche (Anvar), Paris-Defense, France

[22] Filed: Nov. 23, 1970

[21] Appl. No.: 91,847

[30] Foreign Application Priority Data
Nov. 24, 1969 France..............................6940379

[52] U.S. Cl.............................................13/20, 13/25
[51] Int. Cl..................................................H05b 3/10
[58] Field of Search....................13/20, 25; 219/522

[56] References Cited

UNITED STATES PATENTS

| | | | |
|---|---|---|---|
| 3,160,693 | 12/1964 | Palmer | 13/20 X |
| 3,351,742 | 11/1967 | Harris | 13/25 |
| 3,502,847 | 3/1970 | Heide | 13/25 X |
| 3,518,351 | 6/1970 | Ohnsorg et al. | 13/25 |

Primary Examiner—Roy N. Envall, Jr.
Attorney—Larson, Taylor & Hinds

[57] ABSTRACT

The furnace has n superposed rows of m heating elements suspended on supports, the assembly bounding a heating cavity in the form of a tunnel. The elements are U-shaped and suspended at the ends of their arms. The furnace enables temperatures of 2000° to 2200°C to be achieved.

11 Claims, 14 Drawing Figures

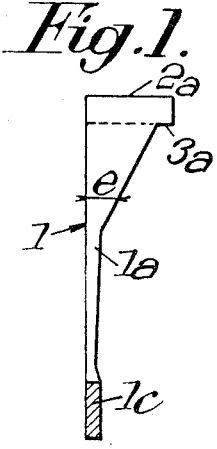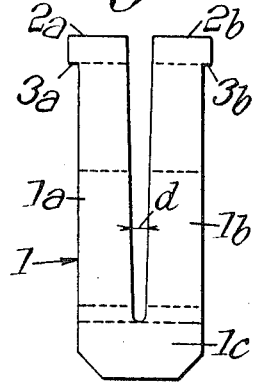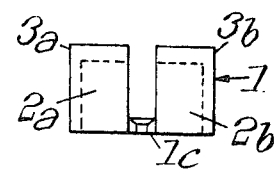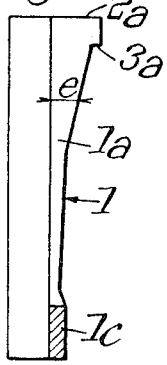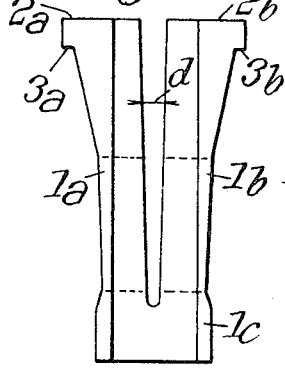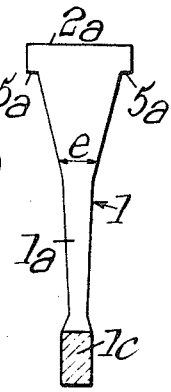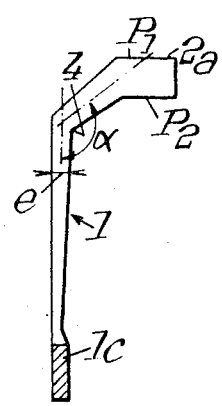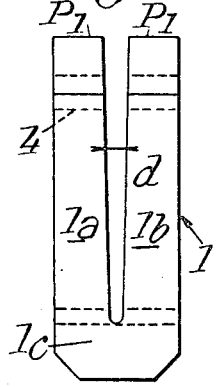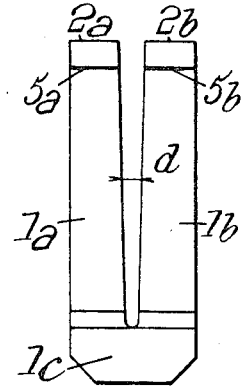

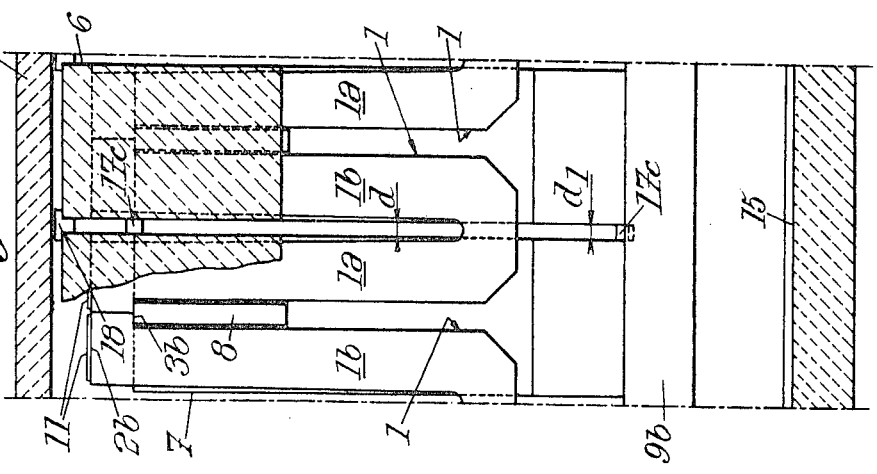
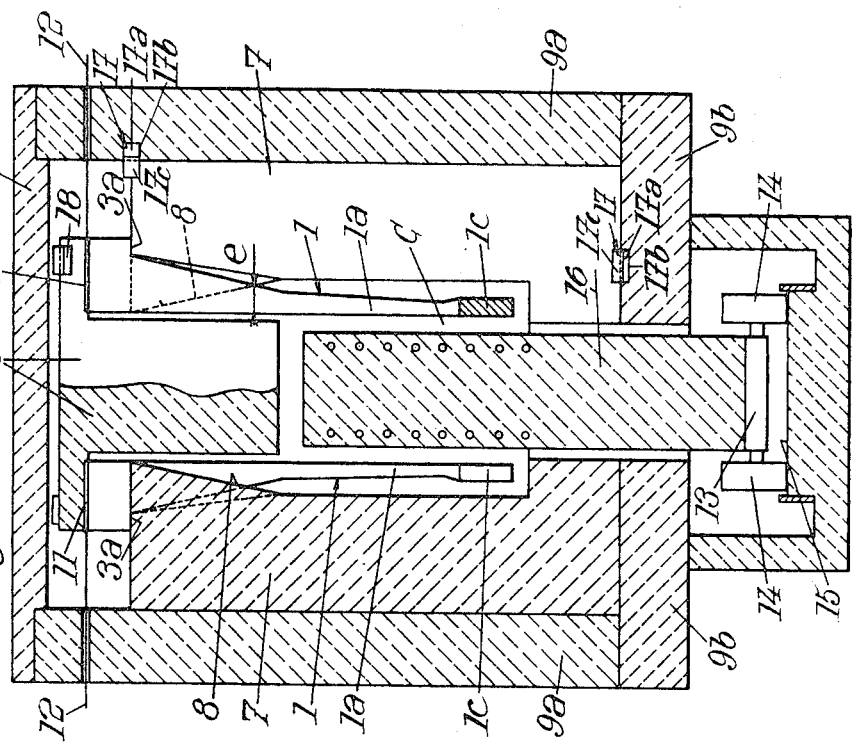

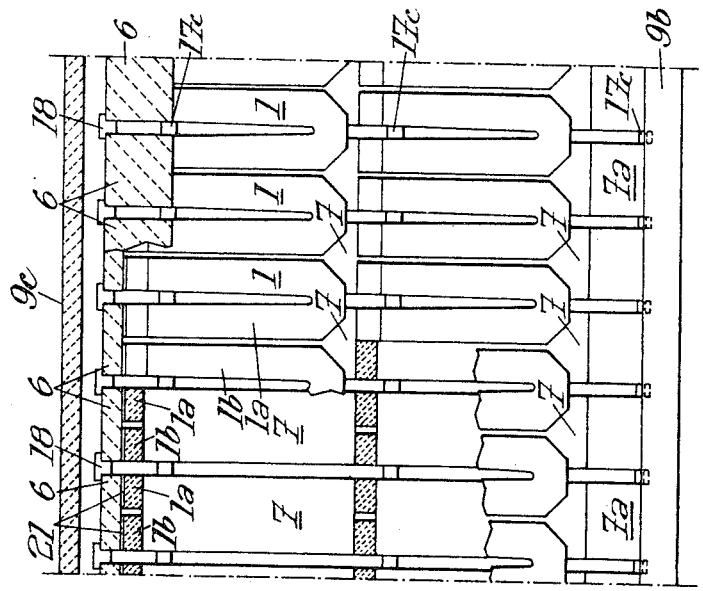

HEATING ELEMENTS, ASSEMBLIES COMPRISING SEVERAL OF THESE ELEMENTS, FURNACES CONSTRUCTED BY MEANS OF SAID ELEMENTS OR ASSEMBLIES, AND PREHEATING METHOD FOR SAID FURNACES

The invention relates to a heating element of the type of those which are constructed of a refractory material with a melting point above 2200°C, resistant to oxidation and of positive coefficient of resistivity and which are generally called "resistors".

It also relates to the assemblies obtained by combining several of the abovesaid elements and the furnaces constructed by means of the abovesaid elements or assemblies and to a method of preheating the said furnaces.

Heating elements are already known which by their constitution define a cylindrical heating space which is necessarily vertical. These elements are particularly suitable for the construction of furnaces of relatively small dimensions. In fact, the weight of these heating elements increases with their power. Now, inside the furnaces which are so equipped, the said elements are generally suspended by preheating tubes of alumina, which, at the temperature of operation of the heating elements, are brought to a temperature close to their melting point and inevitably would flow under too heavy a weight. To establish ideas, it is indicated, for this reason, that it is not possible to contemplate the construction of furnaces of power greater than about 10 KW.

In addition to the problem posed by the weight of the elements reaching or exceeding a certain value, other difficulties arise for such elements in the sense that the power of such preheating furnaces results in posing further problems; in fact, it is noted in this connection that for a furnace of 3 KW, the power of the preheating furnace must be 1 KW, and, for a furnace of 5 KW, the said power must be of about 2 KW.

It is a particular object of the invention, to place at the disposal of the user heating elements enabling the construction of furnaces of other than circular and vertical conformation and of any dimensions.

The resistor heating element according to the invention is characterized by the fact that it comprises two arms in the form of elongated strips, parallel to a plane or inwardly curved parallel to their largest dimension, these arms which are facing their narrow side parallel to their largest dimension being connected at one of their ends by a common part and supplied with electric current at their other end which is shaped in such a way that it enables them to be suspended, the thickness of the said arms as well as the distance which separates them decreasing from the free ends in the direction of the common part.

In a preferred embodiment of the heating element according to the invention, the two arms are parallel to a plane and elbowed at the same level in the same sense with respect to this plane along an angle not exceeding 165°, the free ends of the two arms having two flat surfaces, substantially parallel between themselves and perpendicular to the general direction determined by the largest direction of that of the parts of the elbow which comprise the common part of the two arms.

In another preferred embodiment of the heating element according to the invention, the thickness of the common part of the two arms is greater than the least value of the thickness of each of the two arms.

The assembly of heating elements according to the invention is characterized by the fact that it comprises n superposed rows of m heating elements and as many rows of m−1 support elements of a first type, the constituent arms of a given heating element resting on two neighboring and distinct support elements, these arms supporting in their turn two neighboring support elements of the row situated immediately above, all the arms which are in contact with the corresponding superposed support elements being at the same potential, the outer arms of the heating elements situated at the end of a given row being in addition supported respectively on a support element of a second type of width twice as small as the others, the said support elements either being constructed of material compatible with that of the heating elements at the temperature of operation of the latter, or separated from the latter by platinum shims, or constructed, in the case of operation at very high temperature, of the same material as the heating elements.

In a preferred embodiment, the assembly according to the invention comprises heat insulating means.

The furnace according to the invention is characterized by the fact that it comprises a plurality of heating elements according to the invention each resting by its two arms on distinct neighboring supports, or constructed of a material compatible with that of the heating elements at the temperature of operation of the latter, or separated from the latter by platinum shims, or constructed, in the case of operation at very high temperature, of the same material as the heating element, heat insulating means being provided to protect the said elements and supports.

In a preferred embodiment, the furnace according to the invention is constituted by the assembly of a plurality of heating element assemblies.

The method of preheating according to the invention is characterized by the fact that recourse is had to a movable preheating element acting either on the assembly of heating elements entering into the constitution of the furnace according to the invention, or on some only of the said heating elements; the preheating of the other elements being then ensured more and more by means of radiation from the initially preheated elements, whose temperature is brought to 2000°–2200 °C.

The invention consists, apart from the above-mentioned features, of other features which are preferably used at the same time and which will be more explicitly considered below.

In order that the invention may be more fully understood, several embodiments thereof are described below purely by way of illustrative but non-limiting example, with reference to the accompanying drawings, in which:

FIGS. 1, 2 and 3 represent respectively a section, a view in elevation and a plan view of a first embodiment of a heating element according to the invention;

FIGS. 4, 5 and 6 show in similar manner a second embodiment of the abovesaid heating element;

FIGS. 7 and 8 represent respectively in section and in elevation a third embodiment of the above-said heating element;

FIGS. 9 and 10 show respectively in section and in elevation a fourth embodiment of the said heating element; and FIGS. 11 and 12, just as FIGS. 13 and 14, show respectively a section, with portions removed, perpendicular, and a section with portions removed parallel, to the axis of a furnace in the form of a tunnel arranged according to the invention.

According to the invention and more particularly according to those of its methods of application and its methods of production of its various parts, to which it would appear that preference should be given, in order to construct heating elements 1 of the type concerned as well as assemblies of several of the elements, and furnaces constructed by means of the said elements or assemblies, procedure is as follows or in similar manner.

As regards first of all the heating element which is constituted of a refractory material resistant to oxidation, in general of completely or partially stabilized zirconia, it comprises two elongated arms 1a and 1b parallel to a plane or incurved parallel along their largest dimension. These two arms, which are facing along their narrow side parallel to their largest dimension, are connected at one of their ends by a common part 1c and supplied with electric current through their other free end, and denoted respectively by 2a and 2b. The free end concerned is arranged in such a manner that it enables suspension of the said heating elements.

To obtain a gradient of resistivity in the sense of the length and to avoid any arc formation in the cold portions, the thickness $e$ of the arms and the distance $d$ which separates them decreases from the free ends in the direction of the common part 1c.

As regards this common part 1c, it is advantageous to confer on it, as shown in the drawings, a thickness greater than the least value of $e$, due to which the risk of thermal shock is avoided by rendering the temperature uniform in the part 1c and the life of the element is prolonged. This same object could be achieved by thermally insulating the part 1c. In practice, the abovesaid increase in thickness commences at a distance of 3 to 4 mm above the common part 1c.

In the embodiment of FIGS. 1 to 3, the arms 1a and 1b are parallel to a plane. The free ends 2a and 2b are of rectangular shape and comprise respectively a small collar 3a and 3b on two of their sides, as seen in FIG. 3, due to which it is possible to suspend them.

In the embodiment of FIGS. 4 to 6, the arms 1a and 1b are incurved parallel along their largest dimension. The free ends 2a and 2b are portions of circular crowns and comprise respectively a small collar 3a and 3b to enable their suspension.

In the case of the embodiment of FIGS. 7 and 8, the two arms 1a and 1b are parallel to a plane over a portion of their length and bent at the same level, at 4, along an angle $\alpha$ which does not exceed 165°. The free ends 2a and 2b of the two arms present two flat surfaces $P_1$ and $P_2$ substantially parallel between themselves and substantially perpendicular to the general direction determined by the largest dimension of those of the portions of the two arms which are connected by the common portion 1c. The particular application of this embodiment would emerge from the following description.

In the case of the embodiment of FIGS. 9 and 10, the arms 1a and 1b are parallel to a plane. The ends 2a and 2b each have two ledges, respectively 5a and 5b on each of the faces determined by the group of the two arms. In the following description an advantageous mode of application will be given for heating elements of this type.

The useful part of the heating element according to the various embodiments which have just been described correspond substantially to that of the portions of the arms 1a and 1b which comprise the common part 1c. In present practice, it can reach 2200°C. The heating elements which have been described enable the construction of furnaces of any size and of any shape, that is to say of cylindrical shape or, on the other hand, in the form of a tunnel.

In the embodiment of FIGS. 11 and 12, there is constructed a furnace in the shape of a tunnel comprising an elongated heating cavity C, lined laterally with heating elements 1, closed overhead by heat insulating means 6, constructed generally of the same material as the elements 1, that is to say of completely or partly stabilized zirconia and downwardly open.

As seen in FIG. 11, the heating elements 1, which are for example of the type of those of FIGS. 1, 2, 3 rest by their collars 2a and 2b, on one hand on the upper edge of support elements 7 and, on the other hand on projecting portions 8 for example in the form of a beak, as shown, comprised by the said support elements and entering between the neighboring arms of two neighboring elements 1, it being understood that each element 1 rests by its two arms on two distinct neighboring support elements separated by the distance $d_1$, due to which the short-circuiting of the said heating element is avoided.

The elements 7, are constructed of a material compatible with that of the heating elements at the temperature of operation of the latter, or separated from the latter by shims of platinum, or constructed, in the case if operation at very high temperature, of the same material as the heating elements.

When the furnace is required to operate at a relatively low temperature, the heating cavity being at 1800°–1 900°C, the risks of short-circuiting are eliminated and, instead of distinct supports 7, there can then be contemplated a continuous support in the form of a bar of alumina on which rests the assembly of heating elements, plates being interposed between the bar and the elements 1.

The overhead heat insulating means 6, which are supported on the free ends of the elements 1, can be constituted by distinct neighboring elements, also spaced by $d_1$ from one another and such that a given element 6 is supported on the neighboring arms of two neighboring elements 1, which neighboring arms are of the same potential. However, when the furnace is required to operate at relatively low temperatures, of the order of 1800°–1900°C, it is possible to confer on the element 6 dimensions such that it rests on several elements 1, this element being then constructed of refractory material such as alumina and platinum plates being interposed between the element 6 and the various elements 1.

As seen in FIGS. 11 and 12, the elements 6 and 7 are, in section, respectively in the shape of a T and of an L.

As regards the elements 6, the portion which corresponds to the horizontal bar of the T enables their suspension on the free ends of elements 1 and the portion which corresponds to the leg of the T is inserted between the two rows of elements 1 corresponding to the two walls of the tunnel and hence ensures heat insulation at the level of that of the portions of the heating elements which does not correspond to the useful portion of the latter.

As regards the elements 7, the space which occurs between the horizontal leg and vertical leg of the L serves to receive the elements 1. The spacing between the neighboring elements 7 can be maintained by means of spacing shims 17 provided in the regions of the said elements 7 seen in FIGS. 11 and 12 and in which the latter are not conductive.

The spacing of the neighboring elements 6 can be maintained at their side by shims 18 of which the shape and positioning are apparent in FIGS. 11 and 12.

The assembly constituted by the elements 1 and the elements 6 and 7 is placed inside heat insulating means comprising, as shown, lateral 9a and lower 9b bricks, as well as a cover 9c, constructed of an insulating refractory material such as alumina.

The shims 17 are advantageously composed of a part 17a located in a cavity 17b provided in the bricks 9a and 9b and by a part 17c engaged between two given elements 7.

The supply of the elements 1 with electric current can be ensured by means of platinum contacts 11 arranged on the surface of the free ends 2a, 2b —at which level the temperature does not reach 1600°C — and connected to a source of current by wires 12.

To introduce into the heating cavity, downwardly open as indicated above, of the furnace thus constituted, the parts which have to be subjected to the thermal treatments, recourse can be had to supports 13 adapted to be moved parallel to the axis of the tunnel constituting the heating cavity by means of any system, for example by rollers 14 which run on a rolling track 15 provided under the opening of the heating cavity as shown.

To reheat the elements 1, recourse is had, according to the invention, to a movable preheating element 16 (preheated in suitable manner known in itself, for example electrically) capable of acting, either over the whole, or over some only of the said elements 1, the preheating of the elements 1 being then ensured more and more by means of radiation of the initially preheated elements whose temperature is brought to 2000°–2200°C.

In the case of FIG. 11, there is shown the element 16 placed on the support 13.

When a preheating element is used which acts simply on some opposite elements 1, there is provided on both sides of the said element 16, heat insulating means also borne by the support 13. Under these conditions, as soon as the elements 1 directly preheated have reached the temperature at which they become conductive, the preheating means is gradually moved outwardly, and as soon as, due to the fact of their operation, the preheated elements 1 have reached a temperature close to their proper temperature, they cause by heat exchanges by radiation the increase in temperature of neighboring elements which are hence automatically preheated more and more, without any intervention of the preheating element, whose supply can be cut off.

Of course, the withdrawal of the preheating element and of the heat insulating means between which it is placed at the start must be effected very gradually to avoid any sudden temperature gradient capable of leading to deterioration of the elements 1.

In the type of furnace which has just been described, the height of the heating cavity in the form of a tunnel is limited by the dimensions of the useful portion of the elements 1.

To constitute heating cavities, for example in the form of a tunnel, of any desired height, recourse is had to assemblies of heating elements which can be called "modules" and which constitute in a way construction units which are assembled to one another.

These assemblies comprise $n$ superposed rows of $m$ heating elements 1 as well as as many rows of $m-1$ support elements of the type of support elements 7, which have been considered above, and which are constructed of a material compatible with that of the heating elements at the temperature of operation of the latter, or separated from the latter by shims of platinum, or constructed, in the case of operation at very high temperature, of the same material as the heating elements.

Here again, when the furnace is called upon to operate at a relatively low temperature, of the order of 1800°–1900°C, the risks of short-circuiting are eliminated and, instead of distinct supports 7, recourse can be had to a continuous support of alumina on which rests the assembly of heating elements, platinum plates being interposed between this support and the various elements 1. The constituent arms 1a and 1b of a given heating element 1 rest on two distinct neighboring support elements, and support in their turn two neighboring and distinct support elements, all the arms which are in contact with superposed support elements being at the same potential, the outer arms of the heating elements situated at the end of a row being supported on supports 6 of width twice as small as the other supports 6, this being to enable juxtaposition of the various assemblies or modules.

In FIGS. 13 and 14, there is shown an oven with two stages which can be constructed by means of modules of two rows of superposed heating elements. The length of the tunnel is given by the number of modules used.

Due to this construction, there is obtained a tunnel of which the heating cavity is open downwardly, as in the case of the furnace of FIGS. 11 and 12, and of which the two walls are lined with heating elements 1. To arrange that the two heating surfaces present the minimum of possible discontinuities, recourse is had to heating elements according to the embodiment of FIGS. 7 and 8, by means of which configuration the heating elements of two superposed rows allow only one interval reduced to the maximum, as emerges from FIGS. 13 and 14.

In the case of the embodiment shown, there is again found the upper heat insulating element which is in the form of a T for the same reasons as explained above, as well as support 7 which rest individually on elements 7a, capable of being constructed of the same material as the supports 7.

There is also again to be found the heat insulating means constituted for example by bricks of alumina 9a and 9b and a cover 9c.

The supports 7 and 7a and, if necessary, the elements 6 are held separated from one another, as seen in FIGS. 13 and 14, by shims 17, 18 similar to those described with regard to FIGS. 11 and 12 and placed in the spots seen from the figures and corresponding to the conditions indicated with regard to FIGS. 11 and 12.

In FIG. 13, there is shown a bearing element 20 adapted to bring into the tunnel constituting the heating cavity and to extract from this tunnel, the parts intended to be subjected to the thermal treatment as well as the preheating element.

The supply of electricity to the heating elements 1, is effected by platinum contacts 21 which are connected to the outside by electric wires 12.

For the passage of the electric wires, it is advantageous to provide in the bricks 9a holes 22 of sufficient size to enable them, if necessary, to serve to ensure the cooling of the free ends of the elements 1.

In the case of the embodiment of FIGS. 13 and 14, it relates to a furnace in the form of a tunnel, but it is well understood that there can be constructed, by means of the elements and assemblies according to the invention, staged circular furnaces also.

To fix ideas, it is indicated that in practice, good results are obtained with elements 1 which weigh less than 200 g, of which the length is 150 mm and the width 40 mm, the useful zone having a length of 80 mm. These elements dissipate at 2000°C less than 1 KW and can be taken to 2200°C.

Always by way of example, it is indicated that a furnace of the type of those of FIGS. 11 and 72 constructed by means of six elements of zirconia with 3 percent of CaO, of which the total power is hence 6 KW and of which the dimensions of the heating cavity are 200 × 30 × 40 mm, is always in perfect condition after an operation of 200 hours at 2050°C.

As regards the heating elements according to the embodiment of FIGS. 9 and 10, they enable the constitution of tunnels which are traversed by gases which it is desired to bring to high temperatures. In the tunnels concerned, the elements 1 considered are suspended on two walls bounding the tunnel by their edges 5a and 5b and thus project into the heating cavity. The support elements which constitute at the same time the walls of the heating cavity respond to the same conditions as the support elements 7 which have been considered above.

As a result of which and whatever the embodiment adopted, there are thus available heating elements, assemblies comprising several of these heating elements and furnaces constructed by means of the said heating elements or assemblies, as well as a method of preheating of which the characteristics and the advantages emerge sufficiently from the preceding description for it to be unnecessary to dwell on this subject and which can be adapted in selecting their characteristics as a function of the preceding description, to operate at temperatures which can reach 2200°C or again at lower temperatures of the order of 1800°–1900°C.

As is self-evident and as emerges already besides from the preceding description, the invention is in no way limited to those of its methods of application, nor to those of its methods of production of its various parts which have been more especially indicated; it embraces, on the contrary, all variations.

We claim:

1. Resistor heating element of oxidation-resistant refractory material for a furnace, comprising two arms connected at one end by a common part, said arms being in the form of elongated parallel strips, having narrow facing sides along their longest dimension, the other ends of said arms being free and shaped so that they can be suspended and adapted to be supplied with electric current, the thickness of said arms as well as the distance which separates them decreasing from the free ends in the direction of the common part.

2. Heating element according to claim 1, wherein the two arms are parallel to a plane and bent at the same level in the same sense with respect to said plane along an angle not exceeding 165°, the free ends of the two arms having two plane surfaces substantially parallel between themselves and substantially perpendicular to the general direction of said longest dimension.

3. Heating element according to claim 1, wherein the thickness of said common part of the two arms is greater than the least value of their thickness.

4. Heating element assembly, comprising n superposed rows of m heating elements as claimed in claim 1 and m−1 support elements of a first type, the constituent arms of a given heating element resting on two neighboring and distinct support elements, said arms supporting in their turn two neighboring support elements of the row situated immediately above, all the arms which are in contact with the corresponding superposed support elements being adapted to be at the same potential on application of electric current, the outer arms of the heating elements situated at the end of a given row also being supported respectively on a support element of a second type of width half that of the others, the said second type support elements being constructed of a material compatible with that of the heating elements at the temperature of operation of the latter.

5. Heating element assembly, comprising n superposed rows of m heating elements as claimed in claim 1 and m−1 support elements of a first type, the constituent arms of a given heating element resting on two neighboring and distinct support elements, said arms supporting in their turn two neighboring support elements of the row situated immediately above, all the arms which are in contact with the corresponding superposed support elements being adapted to be at the same potential on application of electric current, the outer arms of the heating elements situated at the end of a given row also being supported respectively on a support element of a second type of width half that of the others, the said second type support elements being separated from the latter by platinum shims.

6. Heating element assembly, comprising n superposed rows of m heating elements as claimed in claim 1 and m−1 support elements of a first type, the constituent arms of a given heating element resting on two neighboring and distinct support elements, said arms supporting in their turn two neighboring support elements of the row situated immediately above, all the arms which are in contact with the corresponding superposed support elements being adapted to be at the same potential on application of electric current, the outer arms of the heating elements situated at the end of a given row also being supported respectively on a support element of a second type of width half that of the others, the said second type support elements being constructed for operation at very high temperature of the same material as the heating elements.

7. Heating element assembly according to claim 4, comprising heat-insulating means supported on the free ends of said elements.

8. Heating element assembly according to claim 4, wherein, for operation of the furnace at a temperature of the order of 1800°–1900°C, the support elements form a single bar of refractory material such as alumina, platinum plates being interposed between the single bar and the heating elements.

9. Furnace comprising an assembly of a plurality of heating elements according to claim 1, each element resting by its two arms on separate neighboring supports, constructed of a material compatible with that of the heating elements at the temperature of operation of the latter, heat-insulating means being provided to protect the said elements and supports.

10. Furnace comprising a plurality of assemblies according to claim 7, said assemblies being juxtaposed to form a downwardly open tunnel, closed overhead by heat insulating means.

11. Furnace comprising an assembly according to claim 8, defining a downwardly open tunnel, closed overhead by heat insulating means.

* * * * *